Oct. 6, 1931.   C. G. BUTLER   1,825,939
GREASE GUN COUPLING
Filed July 21, 1927
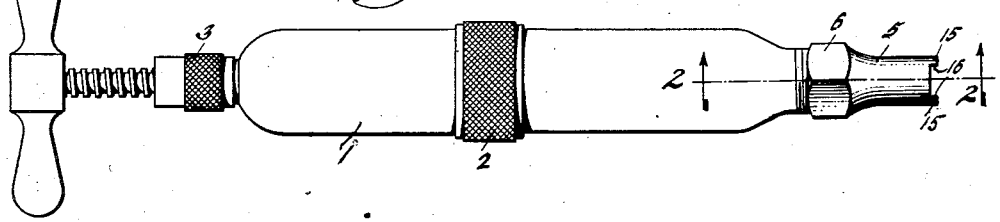
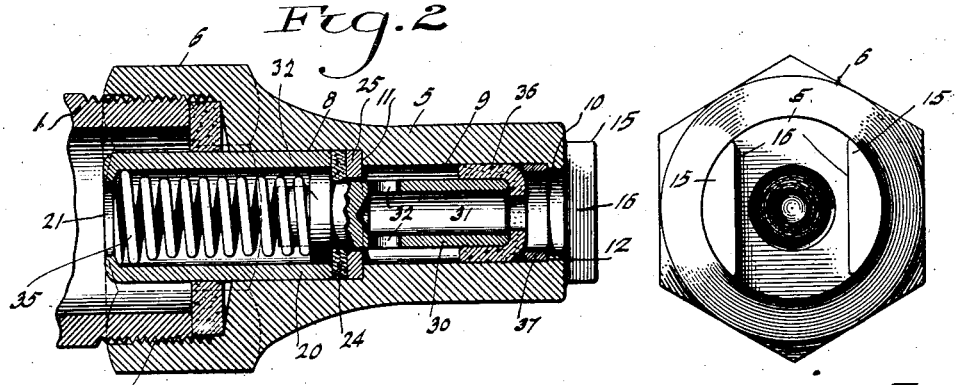
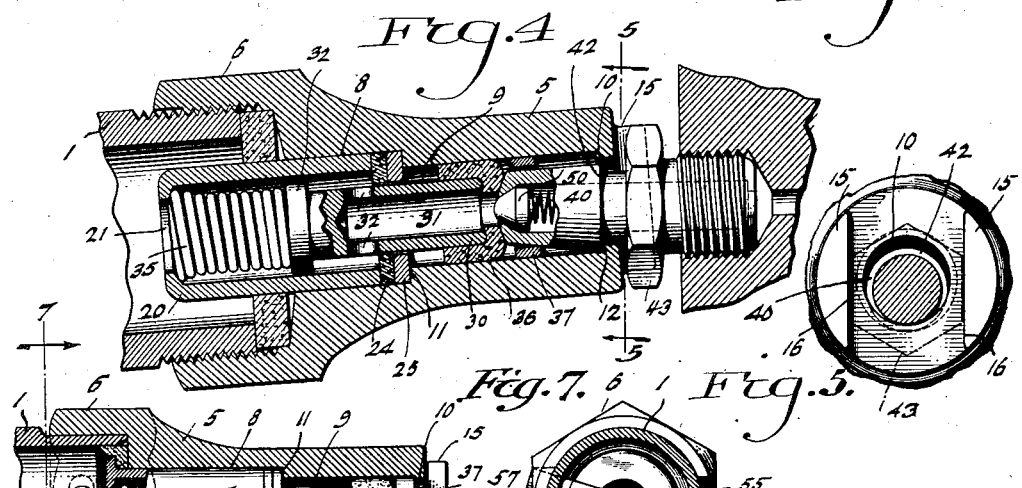
Inventor
Clyde G. Butler
By
Attorneys Patented Oct. 6, 1931

1,825,939

UNITED STATES PATENT OFFICE

CLYDE G. BUTLER, OF CINCINNATI, OHIO, ASSIGNOR, BY MESNE ASSIGNMENTS, TO ALEMITE CORPORATION, OF CHICAGO, ILLINOIS, A CORPORATION OF DELAWARE

GREASE GUN COUPLING

Application filed July 21, 1927. Serial No. 207,532.

This invention relates to a lubricator, and has particular application to lubricating systems adapted to force supplies of oil or grease into various bearings of automobiles, or other machines, and in which a nozzle connection is made with a nipple for distributing the grease to the bearings.

An object of the invention is to provide a lubricating system wherein the delivery end of the lubricant compressor can be conveniently and quickly engaged with and disengaged from the lubricant receiving nipple, for positively delivering lubricant thereto without leakage.

Another object is to provide a connection of the character above mentioned in which the compressor can be disconnected from the nipple without the necessity of relieving the pressure of the lubricant in the compressor, to prevent loss of lubricant.

Another object of the invention is to provide for the opening of the compressor valve by the nipple simultaneously with the operative connection of the two elements, whereby as soon as the delivery end or coupler member of the grease gun is engaged with the lubricant receiving nipple the valve is opened and the device is ready for action.

Another object of the invention is to provide for positive locking of the parts in operative position by simple lateral movement of the grease gun to disalign tne longitudinal axes of the gun and nipple, which disalignment is obtained after the entry of the nipple to locking position within the delivery passage of the coupling member of the gun, and after the delivery and receiving passages are properly connected.

Another object is to provide for the positive delivery engagement of the discharge passage of the nozzle with the passage of the receiving nipple, this object being accomplished herein by providing a nipple centering guide ring in the delivery passage of the nozzle engageable by the nipple whenever the same is inserted in the passage and during and after the valve opening and locking operations, and further providing lugs at the delivery end of the nozzle engageable with an enlargement of the nipple to prevent rotation of the parts when coupled or locked in delivery engagement.

Another object of the invention is the provision of a coupler member which may be conveniently and quickly removed from the barrel of the grease gun to permit filling of the gun and moreover to provide a coupling of this nature which is leak proof.

Other objects and certain advantages of the invention will be pointed out in the description of the drawings forming part of this specification, in which drawings:

Figure 1 is an elevation of the grease gun with the improved coupler nozzle attached to one end thereof.

Figure 2 is an enlarged section through the coupler nozzle on line 2—2, of Figure 1.

Figure 3 is an end view of the nozzle showing spaced lugs to provide a wrench end for non-rotative connection with a nipple.

Figure 4 is a sectional view of the nozzle engaged with a nipple.

Figure 5 is a sectional view on line 5—5, of Figure 4.

Figure 6 is a sectional view of a modification for attaching the coupler to the barrel of the grease gun.

Figure 7 is a section on line 7—7, of Figure 6, further illustrating the coupling arrangement.

The grease gun 1 may be of any conventional form, as herein shown the body or cylinder comprising two tubular sections connected together in leak-proof manner by a suitable union 2, one of the sections being provided with a nipple 3 having two sets of interior threads, one set engaged with an extension of the barrel and the other threads having engaged therewith a screw piston rod, rotatable by a handle and having at its opposite ends the usual piston head, not herein shown.

The grease delivery nozzle to which the invention is particularly directed is shown as applied directly upon the end of the gun, it being recognized however that the nozzle may be connected to the end of a flexible or other extension connected with the gun.

The nozzle comprises a tubular body 5 having an enlarged head end 6, suitably bored and interiorly threaded as at 7, for removably attaching the nozzle to the end of a grease gun or the like. The nozzle is counterbored providing several different diameter bore portions 8, 9, 10, successively decreasing toward the delivery or discharge end. Two shoulders, 11 and 12 are thus provided, one adjacent the outer end and one substantially midway between the ends of the bore. The discharge end of the nozzle is provided with a pair of spaced lugs 15 at opposite sides of the delivery opening and forming opposingly parallel plane faces 16, the lugs preferably being formed by diametrically grooving the end face of the nozzle. Such spanner or socket end formation of the nozzle adapts the nozzle to be non-rotatively engaged or locked to a nipple with which the nozzle removably connects.

Fitting within the bore 8 at the receiving end of the nipple is a substantially cup shaped tubular casing element or thimble 20 having an opening 21 in its end wall at the receiving end, its opposite open end being engaged against a gasket 24 which in turn is engaged against a washer 25 seated against the shoulder 11. The thimble is inserted and connected into the bore of the nozzle under a drive fit thus permanently retaining it in position and against the packing and washer.

A reciprocating sleeve valve 30 is engaged through the packing or gasket 24 and washer 25, and is provided with an annular headed end 32 within the thimble 20. The sleeve valve 30 is bored to provide a passage 31, which passage communicates through lateral openings 32 with the interior of the thimble when the valve is moved to its retracted position for grease or lubricant discharge through the nozzle. The annular head 32 engageable with the gasket 24 is faced on its inner side to form a check valve surface for limiting outward movement of the valve and sealing against leakage when the valve is closed. A coil spring 35, housed and confined within the thimble 30, is engaged against the opposite end of the head of the sleeve valve for forcing the valve to its closed position. The outer end of the cylindrical or sleeve valve 30 is capped with a centrally apertured cup shaped packing 36 which supports and guides the valve within the bore portion 9 of the nozzle and forms a seat for the nipple 40 when the latter is projected into the nozzle. A metallic guide and centering ring 37 is loosely disposed within the bore portion of the nozzle between the end of the sleeve valve and inturned annular flange 10. The ring 37 is adapted to be engaged by a conical nipple as the same enters the nozzle, to engage and force the valve to an open position. When the valve is open passage is thus provided through the thimble 20, and passages 32, 31, into the nipple.

The nipple herein is of tubular formation having a conical head portion 40 for engagement with and moving the sleeve valve, as the nozzle is applied over the nipple. The nipple at the inner end of the head has an annular flange providing a shoulder 42 which engages with the internal flange 11 of the nozzle for locking the nozzle to the nipple, and a polygonal face hub 43 with which the spanner end of the nozzle engages for non-rotatively connecting the nozzle and nipple. The parts are positively locked together when the nozzle is fully applied upon the nipple and canted to effect an engagement between the flange 12 of the nozzle and shoulder 42 of the nipple, slightly disaligning the axis of the nozzle from the axis of the nipple, as shown in Figure 4.

In this position the faces 16 of the lugs 15 are snugly engaged with the corresponding parallel faces of the hub 43, whereby the gun is held and anchored against rotation and need only be manually sustained in its canted or angle position with respect to the nipple for securely connecting the parts when the piston of the gun is fed forward in forcing the lubricant from the gun. The nipple is suitably exteriorly threaded for attachment with the bearing and also has a closure or check valve 50 normally pressed to seated position by a suitable spring. As the nozzle is forced to engagement with the head 40 of the nipple, the ring 37 is also engaged by the head of the nipple and translated forwardly therewith, acting to center the head with relation to the end of the sleeve valve and to maintain proper engagement of the outer end of the head with the gasket 36 and the opening therein. When the axes of the engaged elements are again aligned the shoulders will be disengaged, the head will again pass freely outwardly through the bore 10, and the valve will travel to seated position throwing the centering ring 37 to its original position.

The hub 43 may be of any polygonal configuration which will provide two parallel plane faces engageable by the corresponding parallel faces of the lugs, for non-rotatively removably locking the nozzle to the nipple.

A simple construction is thus provided, the relative diameters of the outermost bore 10 and that of the head 40 immediately adjacent the shoulder 42 being such as to conveniently permit the insertion of the head through the bore 10 while at the same time permitting as small an amount of play as is consistent with easy introduction.

The locking connection between the nozzle and nipple aside from its quick and convenient coupling and uncoupling feature, makes a very secure connection in a longitudinal line of the nozzle so that it cannot be displaced by an excessive pressure applied for forcing the grease through the nozzle and into the nipple to the bearing. The tilting or canting of the nozzle to effect a locking engagement on account of the spanner connection with the nipple can only be made in directions in line with the opposing faces of the spanner lugs on the end of the nozzle so that it cannot be released by any lateral or rotative strains in screwing up the piston of the gun.

The slide or sleeve valve provides a passage in direct connection with the nipple through which the grease is forced and has engagement under pressure with the end of the nipple and this increases with the increase in pressure of the forced lubricant acting against the head of the valve, functioning as a piston in addition to the force of the spring 35. The interposition of a packing between the valve and end of the nipple and under the pressure of which the parts are held together prevents any grease from leaking or oozing out between the joints of said parts, so that the grease if moving through the nozzle must pass into the nipple.

It has been experienced extremely difficult to provide a quickly applicable nozzle and nipple connection which would provide an absolutely sealed joint while forcing grease under a heavy pressure as is sometimes necessary when the bearing to be lubricated is in a condition that is known as being "frozen".

The sleeve valve slides to open position through a packing and the grease enters the bore or passage of the valve at the inlet end through lateral openings. When the openings in the valve are in closed position i. e. on the outer side of the packing, a check valve seal is formed by the head of the valve against the packing, and the valve thus provides an effective nozzle closure against escape or leakage of grease from the nozzle when it is closed. Therefore it is not necessary to relieve the grease in the gun of any forcing pressure when the nozzle is removed from the nipple.

Figs. 6 and 7 illustrate a modified form of construction whereby the nozzle 5 is secured to the barrel of the grease gun by a pin and slot locking means. The enlarged end 6 of the nozzle is provided with a smooth bore adapted to receive the end of the barrel 1 of the gun. The nozzle 5 is provided with bayonet slots 55 adapted to engage the protruding ends 57 of a pin 56 transversely mounted in the barrel 1. A leather sealing cup 21a may be provided in the bore of the enlarged end 6 of the nozzle to form a seal to prevent the escape of any lubricant between the nozzle 5 and the barrel 1. The annular edge 21 of the thimble 20a is preferably flanged to retain the sealing cup 21a within the coupler.

Having described my invention, I claim:

1. The combination with a lubricant receiving nipple, a compressor having a nozzle adapted to be engaged over the nipple, and interlockingly connected therewith only while the nozzle is canted from a longitudinally aligned position of the parts.

2. The combination with a lubricant receiving nipple, a nozzle for connection with a lubricant delivery compressor adapted to be engaged over the nipple and cause interlocking of the parts against longitudinal displacement when the nozzle is canted from a longitudinal aligned position of the parts, and said nozzle having a spanner end for non-rotative engagement with said nipple.

3. The combination with a lubricant receiving nipple, a compressor having a nozzle adapted to be engaged over the nipple, and provided with an annular internal flange at the end thereof for interlockingly connecting with an annular groove in the nipple only while the nozzle is canted from a longitudinally aligned position of the parts.

4. In a lubricating system, a fluid delivery nozzle element providing a shoulder, and a nipple having a shoulder adapted to be lockingly engaged with said first mentioned shoulder only when said nipple element is within said nozzle element, and as and when said elements are axially disaligned.

5. In a device of the class described, a lubricant delivery nozzle having an internal circumferentially disposed shoulder, and a lubricant receiving nipple having an external circumferential shoulder adapted to be lockingly engaged with said internal shoulder when the nipple is inserted within the nozzle only when one of the elements is tilted.

6. In a lubricating system, a lubricant delivery nozzle having an internal circumferential shoulder and a lubricant receiving nipple having an external circumferential shoulder adapted to cause interlocking of the parts when the nipple is inserted within the nozzle and one of the elements tilted to axially disalign the same, and means for preventing relative rotation of the elements when connected.

7. In a lubricating system, a lubricant delivery nozzle having an internal circumferential shoulder, a nipple having an external circumferential shoulder adapted to be lockingly engaged with said internal shoulder only when the nipple is inserted within the nozzle and one of the elements tilted to axially disalign the same, and means for centering and guiding the nipple during insertion.

8. In a lubricating system, a lubricant delivery nozzle providing an internal shoulder in its delivery passage, and a lubricant receiving nipple having an external shoulder adapted to be lockingly engaged with said internal shoulder only when the nipple is inserted in the nozzle passage and one of the elements tilted.

9. In a lubricating system, a lubricant delivery nozzle providing an internal shoulder in its delivery passage and having spaced lugs at opposite sides of its delivery opening, a lubricant receiving nipple having a portion adapted to enter the delivery passage of the nozzle, and having a circumferential shoulder adapted to engage the shoulder of said delivery passage when said nipple is inserted therein, to maintain the nipple and nozzle in engagement only when the nozzle is tilted.

10. In a device of the class described, a lubricant delivery nozzle having a shoulder in its delivery passage and having a yieldable inwardly opening valve for closing said passage, and a lubricant receiving nipple having a head adapted to open said valve when inserted in said passage and having a shoulder adapted for locking engagement with said first shoulder as and when the delivery passage of the nozzle and the nipple are axially disaligned, when said nipple is within said passage, and when said valve is open.

11. In a device of the class described, a tubular coupler member having spaced parallel lugs at opposite sides of its delivery opening, said member having an internal circumferential shoulder adjacent its delivery end and further having a yieldable valve in its delivery passage adapted to normally prevent liquid egress therefrom, a lubricant receiving nipple having a head portion adapted to enter the coupler passage and to engage and open the valve, and having an enlargement adapted to engage between said lugs to prevent lateral play between the parts and further provide a shoulder at the rear of the head engageable with the corresponding internal shoulder of the coupler to securely lock the elements in operative position when the axes of the same are disaligned.

12. In a device of the class described, a tubular coupler member diametrically grooved at its delivery end to provide spaced parallel lugs at opposite sides of its delivery opening providing plane opposingly related lug faces, said coupler member having an internal circumferential shoulder adjacent its delivery end and further having a yieldable valve adapted to normally prevent liquid egress from the delivery passage, a nipple having a head portion adapted to enter the coupler delivery passage and to engage and open the valve therein, and further providing a shoulder at the rear of the head engageable with the corresponding internal shoulder of the coupler to securely hold the elements in operative position when the axes of the elements are disaligned after shoulder engagement.

13. In a device of the class described, a tubular coupler member diametrically grooved at its delivery end to provide spaced parallel lugs at opposite sides of its delivery opening, said lugs providing plane opposingly related lug faces, said coupler member having an internal circumferential shoulder adjacent the delivery end and further having a yieldable valve adapted to normally prevent fluid egress, a tubular lubricant receiving nipple having a head portion adapted to enter the delivery passage of the coupler member to open the valve and having a shoulder at the rear of the head lockingly engageable with the corresponding shoulder of the coupler when the axes of the elements are disaligned after engagement, said head further provided with a circumferential polygonal enlargement having pairs of opposingly related parallel plane faces engageable with said lugs to prevent lateral motion and rotation between the elements when in engaged position.

14. In a device of the class described, a tubular coupler member having spaced parallel lugs at opposite sides of its delivery opening, said coupler member having an internal circumferential shoulder in its delivery passage adjacent the delivery end thereof, and further having a yieldable valve adapted to normally prevent liquid egress from said passage, a movable centering ring within said passage against which said valve is adapted to rest, a tubular lubricant receiving nipple adapted to enter the bore of the coupler member to open the valve and further adapted to engage and be guided by said centering ring during the opening of and when said valve is opened, said nipple having a circumferential shoulder engageable with the corresponding shoulder of the coupler for locking the elements in locking position as and when the axes of the elements are disaligned after engagement, said nipple having a circumferential enlargement providing parallel faces with which the lugs of said coupler member are engaged to prevent lateral movement and rotation between the elements when in locked position.

In witness whereof, I hereunto subscribe my name.

CLYDE G. BUTLER.